US009311170B2

(12) United States Patent
Kline

(10) Patent No.: US 9,311,170 B2
(45) Date of Patent: *Apr. 12, 2016

(54) SYSTEM, METHOD AND PROGRAM TOOL TO RESET AN APPLICATION

(75) Inventor: Christopher N. Kline, Firestone, CO (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

This patent is subject to a terminal disclaimer.

(21) Appl. No.: 11/847,536

(22) Filed: Aug. 30, 2007

(65) Prior Publication Data
US 2007/0294708 A1 Dec. 20, 2007

Related U.S. Application Data

(63) Continuation of application No. 10/728,518, filed on Dec. 4, 2003, now Pat. No. 7,296,273.

(51) Int. Cl.
*G06F 9/44* (2006.01)
*G06F 9/54* (2006.01)

(52) U.S. Cl.
CPC .......... *G06F 9/546* (2013.01); *G06F 2209/548* (2013.01)

(58) Field of Classification Search
None
See application file for complete search history.

(56) References Cited

U.S. PATENT DOCUMENTS

| 5,224,215 | A | | 6/1993 | Disbrow |
| 5,367,635 | A | | 11/1994 | Bauer et al. |
| 5,452,430 | A | * | 9/1995 | Dievendorff et al. ........... 714/37 |
| 5,465,328 | A | * | 11/1995 | Dievendorff et al. ........... 714/15 |
| 6,058,389 | A | | 5/2000 | Chandra et al. |
| 6,154,847 | A | * | 11/2000 | Schofield et al. ................ 714/4 |
| 6,161,218 | A | | 12/2000 | Taylor |
| 6,493,826 | B1 | * | 12/2002 | Schofield et al. ............... 726/22 |
| 6,567,849 | B2 | | 5/2003 | Ludovici et al. |
| 6,609,158 | B1 | | 8/2003 | Nevarez et al. |
| 6,615,166 | B1 | | 9/2003 | Guheen et al. |
| 6,625,117 | B1 | | 9/2003 | Chen et al. |
| 6,704,767 | B1 | | 3/2004 | Simmons et al. |
| 6,934,247 | B2 | | 8/2005 | Bhattal et al. |
| 6,976,260 | B1 | | 12/2005 | Ault et al. |
| 7,111,063 | B1 | | 9/2006 | Clark et al. |
| 7,136,868 | B2 | | 11/2006 | Sonkin et al. |
| 7,159,221 | B1 | | 1/2007 | Willen et al. |
| 2001/0047495 | A1 | * | 11/2001 | Kettley et al. ..................... 714/2 |
| 2002/0064126 | A1 | * | 5/2002 | Bhattal et al. ................. 370/217 |
| 2002/0174420 | A1 | | 11/2002 | Kumar |

(Continued)

*Primary Examiner* — Shih-Wei Kraft
(74) *Attorney, Agent, or Firm* — Schmeiser, Olsen & Watts, LLP; Matthew Chung

(57) ABSTRACT

Deleting objects used or managed by an application or application or application instance is disclosed. Second program instructions identify the objects. Second program instructions write an executable program to delete the objects which were identified. Objects than can be deleted include local queues, alias queues, remote queues, security objects, channel objects, process objects, etc. The first program instructions identify a queue object and determine whether the queue object contains a work item. If so, the second program instructions write into the executable program a command to clear the work item. Deleting a queue object managed by an application or application instance is also disclosed. Channels used by other applications or other application instances to lock and access a queue defined by the queue object are identified. Then, the channels are stopped. Afterwards, the work item(s) on the queue are cleared and then the queue object is deleted.

16 Claims, 6 Drawing Sheets

(56) References Cited

U.S. PATENT DOCUMENTS

| | | |
|---|---|---|
| 2003/0028642 A1 | 2/2003 | Agarwal et al. |
| 2003/0046442 A1 | 3/2003 | Maryka et al. |
| 2003/0112802 A1 | 6/2003 | Ono et al. |
| 2004/0054896 A1 | 3/2004 | Himmel et al. |
| 2005/0086237 A1 | 4/2005 | Monnie et al. |

\* cited by examiner

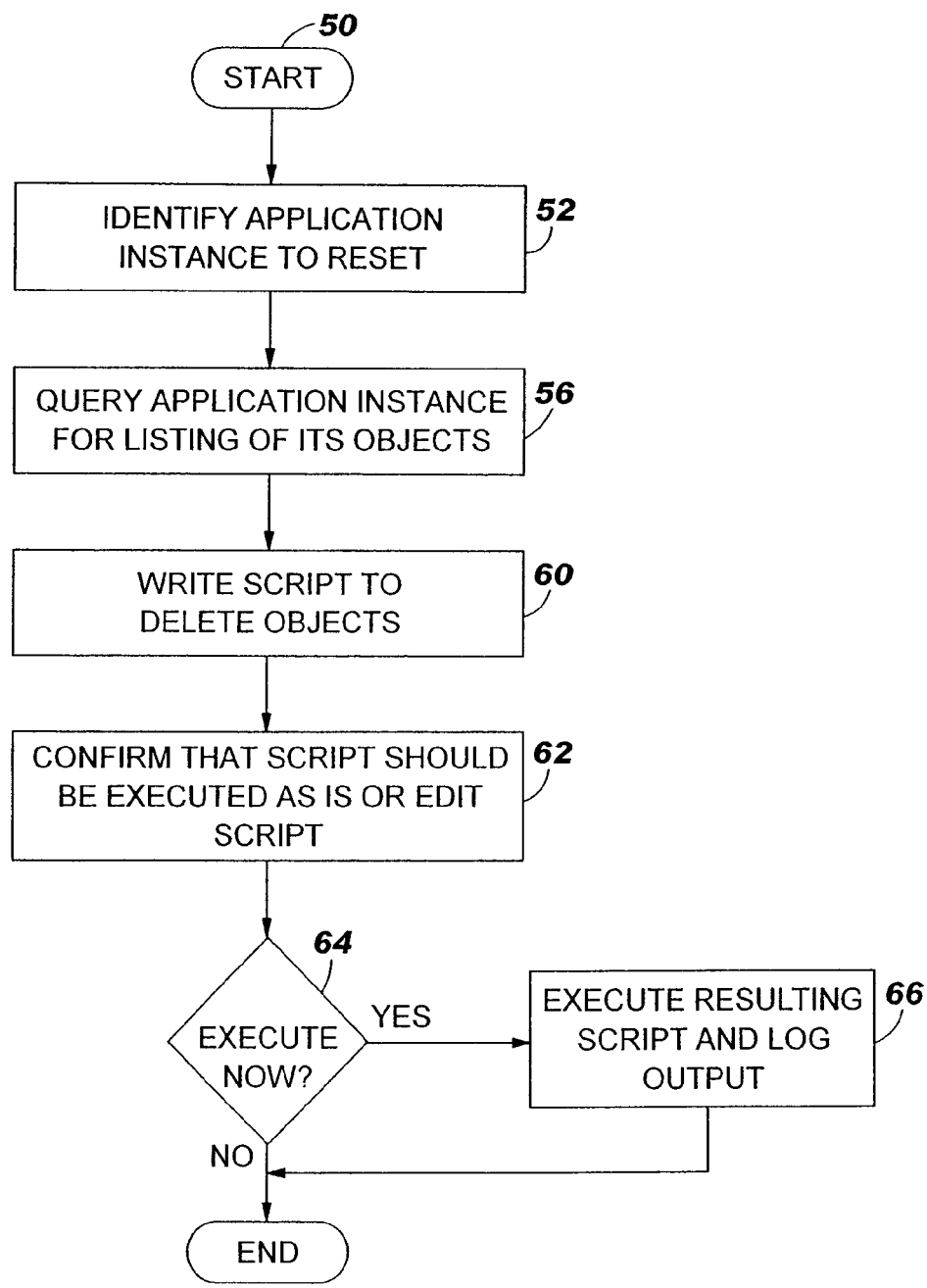

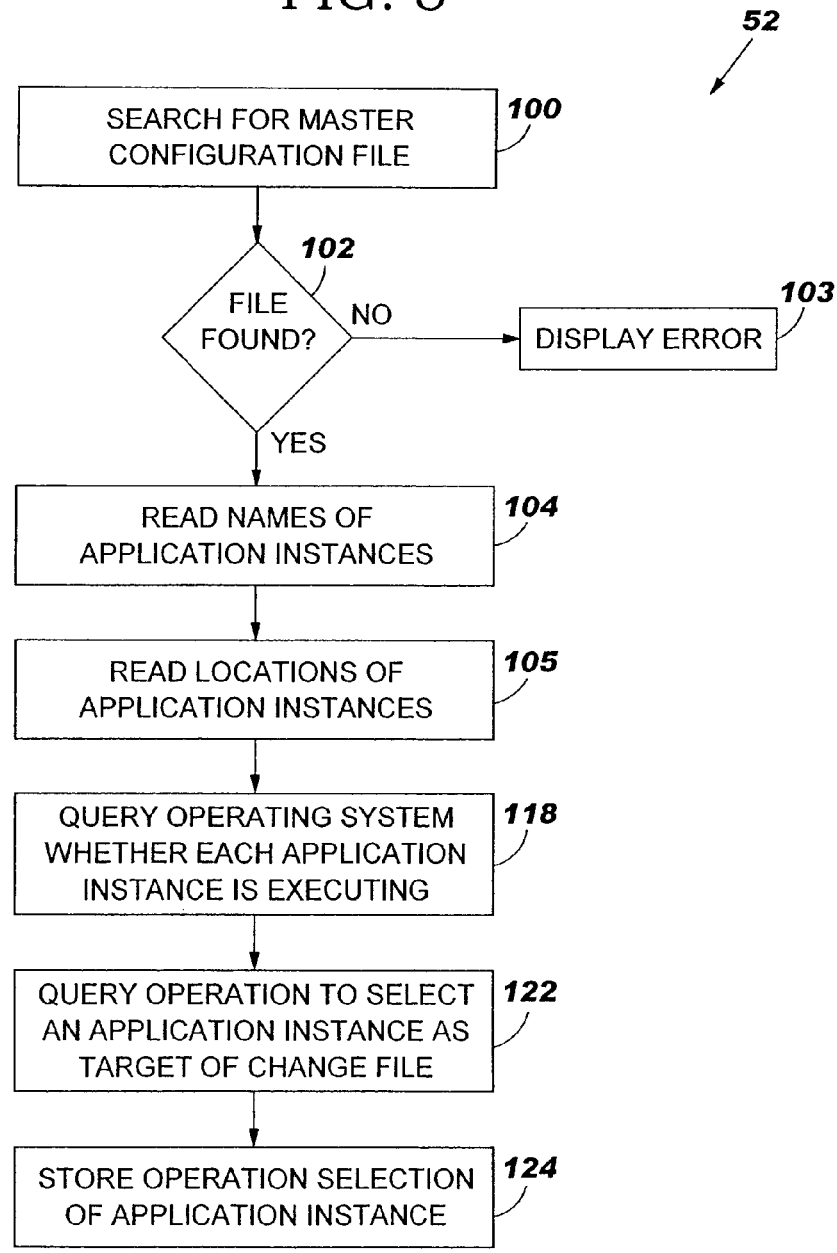

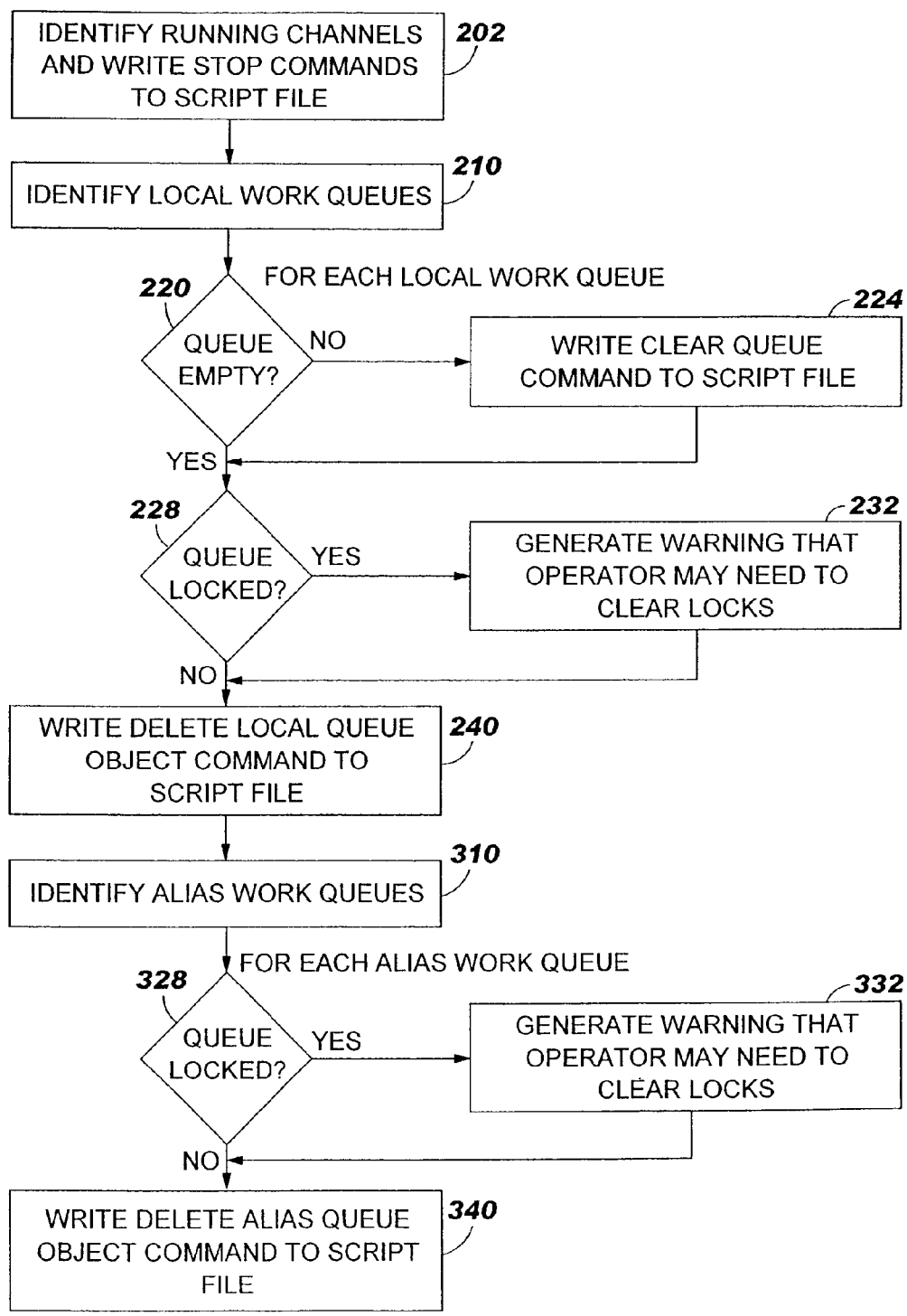

SYSTEM, METHOD AND PROGRAM TOOL TO RESET AN APPLICATION

CROSS REFERENCE TO RELATED APPLICATION

This is a continuation of application Ser. No. 10/728,518, filed on Dec. 14, 2003 and is now US Published Patent Application No. 20050125810 A1.

FIELD OF THE INVENTION

The invention relates generally to computer systems, and deals more particularly with a technique to reset an application to remove objects created by the application.

BACKGROUND

Many types of applications create "objects" as the applications execute. There are various types of objects; each used internally by an application for operation, particularly in the realm of middleware software. By way of example, work queue objects contain work items or messages waiting to be handled and are configured via object attributes (such as maximum length of the queue, any routing information indicating where to route work items on the queue, security settings, utilization monitoring settings, clustering settings). A "process" object may contain information about an external program that should be started when a work item or message arrives on the queue. A "name list" object is a listing of other object names which can be contacted as a group. A "security" object (such as an SSL security object) contains attributes for security settings. A "user" object may contain records about the respective user. A "device" object may represent computer components such as printers. A "channel" object may describe attributes of a communications channel used by the application (i.e. name of the channel, IP address of channel connection, channel type, security information and connection parameters.

There are certain circumstances when it is necessary to reset an application or application instance, i.e. clear or delete some or all objects created by the application or application instance. For example, if the configuration of an application becomes so complex or corrupted that it can no longer execute effectively, it may be necessary to reset it. As another example, another external program may need to be tested for compatibility with the application, and a clean/original state of the application may be needed where the application initially has no objects of the type created during execution. To make matters more difficult, some types of objects may be locked by an external application or operating system such that no other application can access the queue, and the queue cannot be removed while locked.

There are different, known techniques to reset an application or application instance. A systems administrator with appropriate level of privilege can manually enter commands to identify the application instances, and then query each application instance to determine the types and names of objects used by or present in the application instance. For example, the application instance would often report a queue object and whether it was locked and contained work items. In such a case, the queue object needed to be unlocked and its work items needed to be removed before the queue object itself could be removed. The lock removal was performed by contacting the holders of the locks and asking them to stop execution of their external applications which hold the locks. After removal of the locks, the systems administrator entered manual commands to clear the work items on the queue and then remove the queue object. Typically, thousands of commands were required to complete such a process and these commands were typed manually. Also, there was time and effort expended in contacting the holders of the locks on the queue objects and waiting for them to stop execution of their applications which held the locks.

Alternately, an operator could delete the current application instance altogether, and install a new, clean copy of the application instance. However, this caused problems such as loss of settings and an outage to the application. Also, the operator would typically need a super high level of privilege such as root privilege to delete an application instance (depending on the configuration), and the operator may not have such level of privilege.

Accordingly, a goal of the present invention is to facilitate the resetting of an application or application instance.

Another object of the present invention is to facilitate the removal of a queue object.

SUMMARY OF THE INVENTION

The invention resides a computer program product and system for deleting objects used or managed by an application or application instance. First program instructions identify the objects. Second program instructions write an executable program to delete the objects which were identified. There are wide variety of objects than can be deleted such as local queues, alias queues, remote queues, security objects, channel objects, process objects, etc.

According to features of the present invention, the first program instructions identify a queue object and determine whether the queue object contains a work item (such as a message). If so, the second program instructions write into the executable program a command to clear the work item.

According to other features of the present invention, third program instructions identify channels used by other applications to lock and access a queue object. The second program instructions write into the executable program a command to stop the channels. If the queue object is locked, fourth program instructions warn an operator that the queue object may remain locked despite stoppage of the channels.

The invention also resides in a computer program product, system and method for deleting a queue object managed by an application or application instance. Channels used by other applications or other application instances to lock and access a queue defined by the queue object are identified. Then, the channels are stopped. Afterwards, the work item(s) on the queue are cleared and then the queue object is deleted.

In accordance with a feature of the present invention, an operator is warned that the queue object may remain locked after stoppage of the channels.

BRIEF DESCRIPTION OF THE FIGURES

FIG. 2 is a flow chart of the program tool of FIG. 1.

FIG. 3 is a more detailed flow chart of step 52 of the flow chart of FIG. 2.

DETAILED DESCRIPTION OF THE PREFERRED EMBODIMENTS

Figure 1:
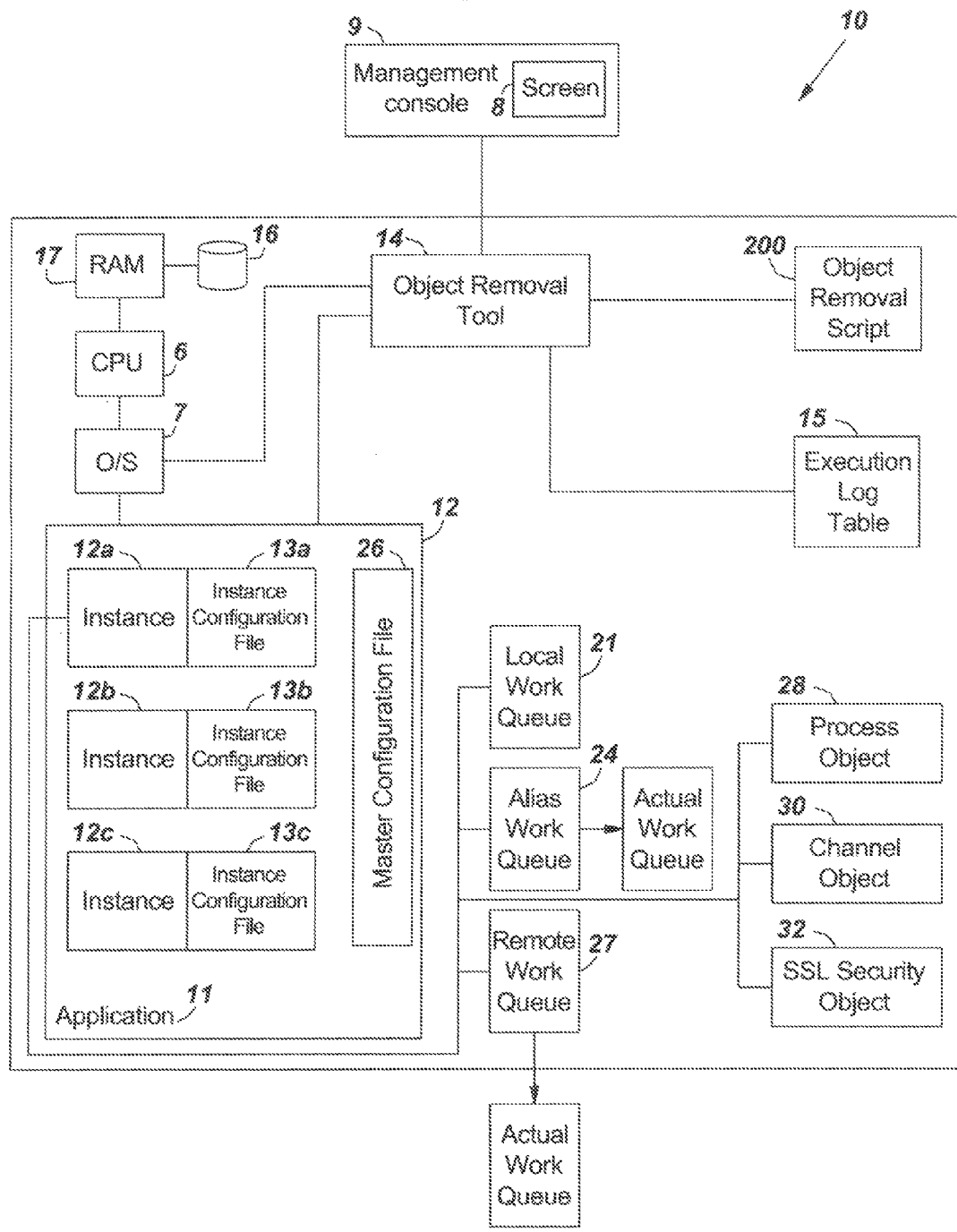
FIG. 1 is a block diagram of a computer system which includes a program tool according to the present invention and an application that is reset by the program tool.

The present invention will not be described in detail with reference to the figures, wherein like reference numbers indicate like elements. FIG. 1 illustrates a computer system generally designated 10 which comprises a CPU 6, and operating system 7, and a management console 9 for an operator. The management console 9 includes a display screen 8, and a keyboard and mouse (not shown). An application 12 and its instances 12a,b,c to be reset according to the present invention is executing in system 10. By way of example, application 12 is a middleware application such as a prior art IBM WebSphere MQ (formally known as IBM MQSeries) application which interconnects different, customer applications. A program tool 14 has been loaded into system 10 to reset application 12 in accordance with the present invention. Program tool 14 is stored in hard disk storage 16 for execution by CPU 6 via RAM 17.

FIG. 1 also illustrates an example, where there are three instances 12 a,b,c spawned from original application 12. Each "instance" of application 12 is a copy of application 12 which executes as a separate process with a separate configuration defined by respective configuration files 13a,b,c. Application instance 12a has created multiple local work queues (objects) such as local work queue 21, alias work queues (objects) such as alias work queue 24, remote work queues (objects) such as remote work queue 27, process objects such as process object 28, channel objects such as channel object 30 and SSL security objects such as security object 32. By way of example such as an existing IBM WebSphere MQ application, each application instance (referred to as a queue manager) 12a,b,c manages its queues and serves as an interface between customer application(s) that supplies the work items to the queues and customer applications that receive the work items from the queues. The work items can be messages. In this role, each application instance (or queue manager) manages I/O to the queues, configuration of the queues, security of the queues, etc. However in this example, each application instance (or queue manager) does not process the work items on the queue. For example, if the work item is a request for a web page, the instance of, application 12 that manages the queue would not supply the web page, but rather would make the request available to a web server that accesses the queue. Although not shown, there are typically many such local work queues, alias work queues, remote work queues, process objects, channel object and SSL security objects managed by a single application instance (or queue manager), which can be reset in the same manner by program tool 14 as described below. Also, an application instance can create other types of objects which can be reset by program tool 14 in a similar manner as described below. Also, program tool 14 can reset an application which does not have separate "instances", in a similar manner as described below. FIG. 1 also illustrates a script program 200 written by the program tool 14 to delete application-created objects. An execution log table 15 logs an output of the script program 200 after execution. The output may contain information about the success or failure of each of the script commands that was automatically generated by program 14 and executed in program 200. This output can be used by the operator to make sure object removal completed successful.

FIG. 2 is a flow chart illustrating the steps performed by and operation of program tool 14 to reset an instance of application 12. An operator starts program tool 14 in step 50. Then, program tool 14 queries the operating system and application to identify all instances of application 12 that are currently installed in system 10. After receiving the response, program tool 14 displays a list of the application instances that are currently installed and whether each application instance is currently running (step 52). Then, an operator selects one of the application instances for resetting (step 52). Then, program tool 14 queries the selected application instance for its object configuration information, i.e. a list of objects currently associated with the application instance (step 56). These objects can include work queue objects (local, alias and remote), process objects, channel objects, security object, name list object, device object, user object, etc. Program tool 14 identifies for deletion those objects which were created for external application use. Program tool 14 identifies (and thereby eliminates) the system-created objects by the naming convention, for example, all system objects may begin with "system . . . ". User-defined objects will have names beginning with other characters. As explained below, in the preferred embodiment of the present invention, program tool 14 will only delete user-defined objects. This is because the application instance will need the objects created by the system to execute. As explained in more detail below, program tool 14 will also determine which of the objects to be deleted are empty or non empty, and which are locked or unlocked. Both factors affect the manner of their deletion.

As each object is identified in step 56, program tool 14 writes a line or lines of script to delete the object (step 60). By way of example, the script program can be written using a Unix™ korn shell scripting language, which interfaces with an application interface such as the "runmqsc" command for the IBM Web Sphere MQ application. By way of example, to write the line or lines of script to delete each object, program tool 14 can include conditional statements and commands for each type of object. If the condition is met, i.e. the type of object is found and targeted for deletion, the conditional statement leads to the line or lines of script command that program tool 14 adds to the script program to delete the object.

Next, program tool 14 notifies the operator (through a display screen) that a customized script program has been created and is ready for execution to remove all user-configured objects for the application instance, and asks the operator if the operator wants to review the script program before it is executed (step 62). If the operator enters an approval to execute the script now, (decision 64), program tool 14 executes the foregoing script program to do so (step 66). Output from step 66 (i.e. execution of program script 200) will be logged for later review. Conversely, the operator can edit the script program so that fewer or additional objects are deleted when the script program is subsequently executed.

FIG. 3 illustrates step 52 in more detail, i.e. the identification of the application instance to be reset. In step 100, program tool 14 searches for the application master configuration file 26 at a predetermined location. If program tool 14, does not find the master configuration file 26 (decision 102, no branch), then program tool 14 displays an error message (step 103). Referring again to decision 102, if program tool 14 finds the application master configuration file 26, then program tool 14 reads the names and then the locations of all instances 12a, 12b and 12c of application 12 that are currently installed (steps 104 and 105). If no instances are currently installed, then program tool 14 displays a message that no instances of application 12 are currently installed and the program tool 14 exits. Referring again to decision 104, assuming there is at least one instance of application 12 currently installed, for example, instance 12a, program tool 14 queries the operating system to determine whether these instance(s) are currently executing (step 118). Also, tool 60 tests each of the executing application instances, such as with an application "ping" query (for example, using a "runmqsc" command when querying IBM Web Sphere MQ application instances), to confirm that the application instance is responsive (step 120). (The nature of the query is not important; it is only intended to determine if the application instance is responsive.) Next, program tool 14 displays a list of the application instances (and an indication if they are currently executing) and queries the operator at console 9 to select one of the application instances as the target of the resetting operation (step 122). Program tool 14 then records the operator selection (step 124).

Figure 4B:
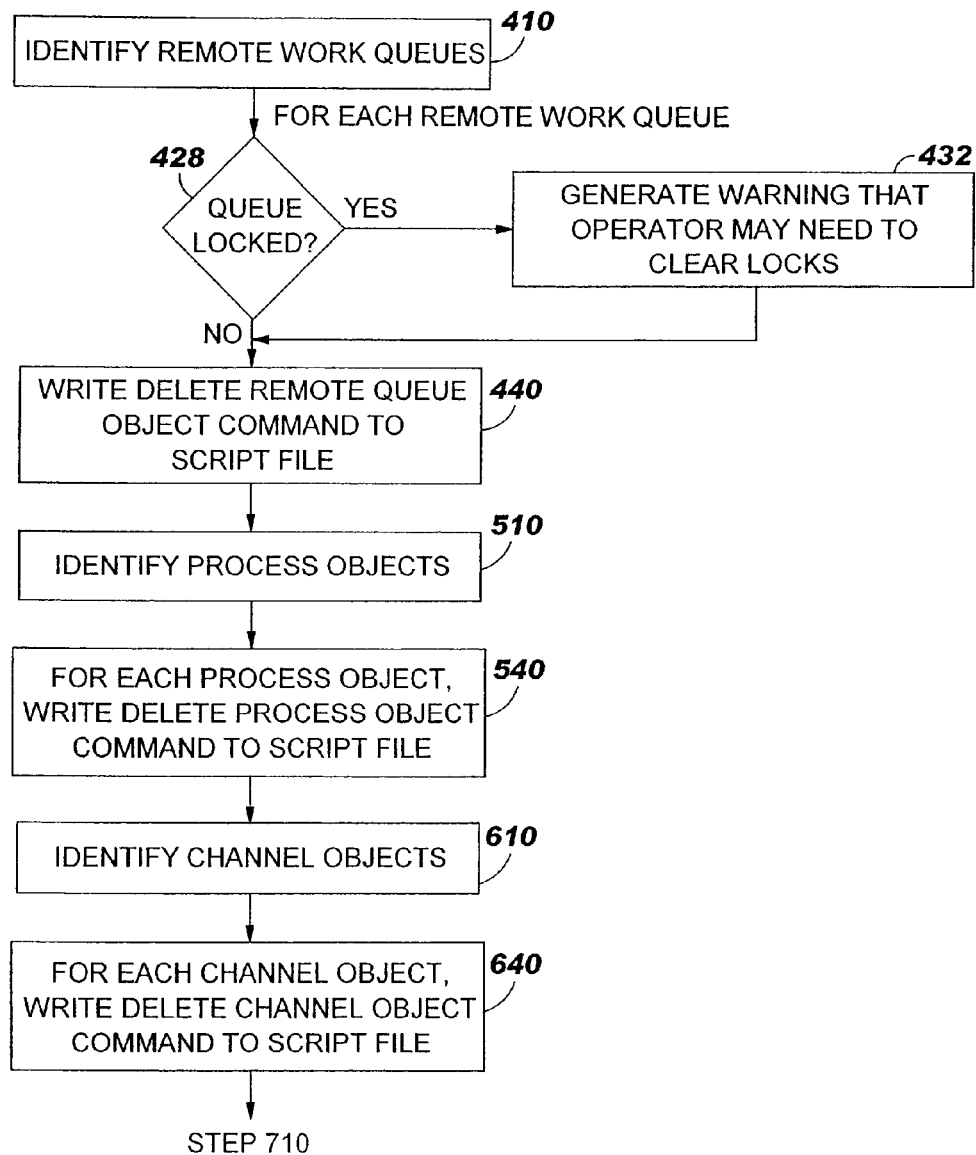
FIGS. 4(A, B and C) form a more detailed flow chart of steps 56 and 60 of the flow chart of FIG. 2.
Figure 4C:
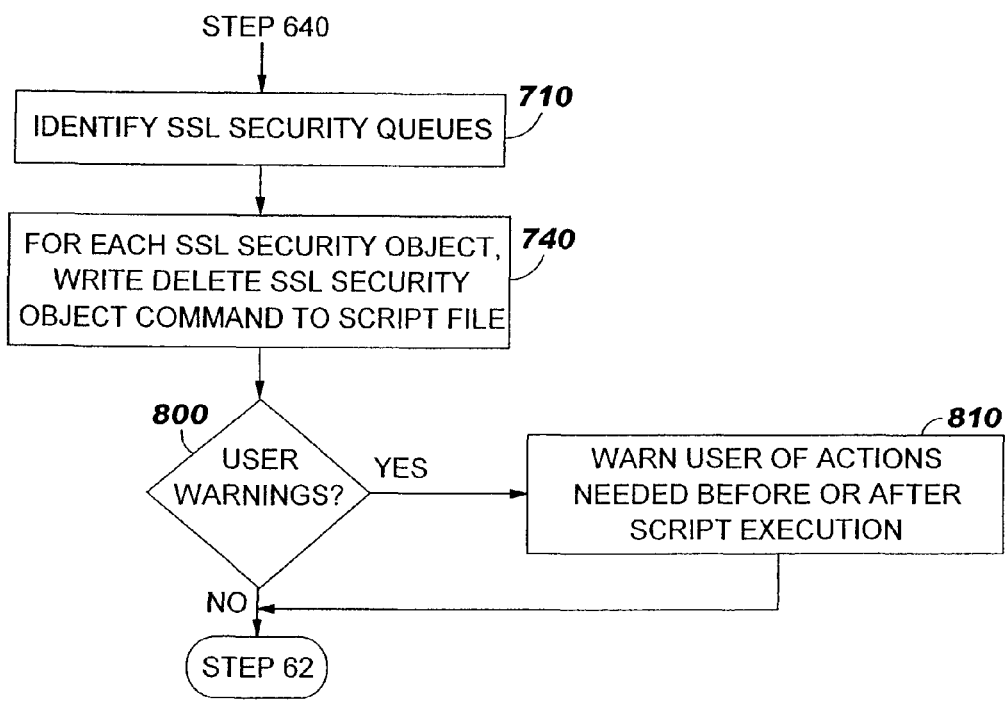

FIGS. 4(A-C) illustrate steps 56 and 60 in more detail, i.e. the identification of the objects to be deleted and their current status and the generation of the script program for deleting these objects. In the case of queue objects, it is usually necessary to remove locks on the objects before deleting the objects. Many types of locks are secured and held via a channel connection, and will automatically be removed if the channel is stopped or terminated. Program tool 14 determines which channels are currently being used by other applications that access the queue (either to add work items or remove work items) by querying the application instance for a list of the running channels (step 202). Then, for each such running channel, program tool 14 writes a "channel stop" command to a file 200 in which the script is built (step 202). Each "channel stop" command will identify the respective channel to be stopped. When the script is subsequently executed to control the application instance, the application instance will issue a corresponding channel stop command to close the channel connection. As explained in more detail below, some locks are secured by paths other than these channels, and these locks may need to be removed by other means.

Next, program tool 14 queries the instance of application 12 for a list of "local" work queues defined by the application instance (step 210). To accomplish this identification, the application instance first identifies all of its work queues by communicating with the application via an interface command such as the "runmqsc" command for the IBM WebSphere MQ application. A query is made to the application instance and the output containing the list of defined queue names is saved by program tool 14. Then, the application instance identifies the local work queues by a "local" type attribute associated with each local work queue. "Local" means that the queue resides in the system where the application instance executes, and the named work queue contains the actual work items; there is no aliasing used to locate the actual work queue which contains the actual work items. The list includes the identity of each local work queue and the length of the local work queue (referred to as "depth") or whether there is at least one work item on the local work queue. Then, for each local work queue, program tool 14 determines from this list if the local work queue is empty (decision 220). If not, then program tool 14 writes a "clear local work queue" command to the script file 200 for the named local work queue (step 224). When the script file is subsequently executed to control the application instance, the application instance will clear the named local work queue, i.e. delete all the work items on the queue so the queue will be empty. (The "clear local work queue" will not delete the local work queue object itself). After step 224, or if the local work queue was empty, then program tool 14 determines if the local work queue is currently locked/in use (decision 228). This determination is made by reading a "handle count" attribute of the local work queue. The "handle count" is incremented each time an application instance connects to the local work queue. If the "handle count" is greater than zero, then the local work queue is currently locked/in use. If the local work queue is currently locked/in use, then program tool 14 generates a warning that the operator may need to "clear connections" to the named local work queue to the extent they are not cleared by the lines of script which stop all channels to the application instance (step 232). This warning will be displayed later (in step 810), just prior to execution of the script. After step 232 or if the local work queue was not currently locked/in use, program tool 14 generates a delete work queue command and writes it to the script file (step 240). If the work queue was locked/in use, then the same delete work queue command can be written to the script file, but "commented" out. This disables the command from completing when the file is executed and allows the administrator to first verify that the queue is unlocked before uncommenting and re-enabling the command. When the script file is subsequently executed to control the application instance, the application instance will delete the named local work queue, i.e. delete the named local work queue object. The foregoing steps 220-240 are repeated for each other local work queue identified in step 210.

Next, program tool 14 begins a process to identify and write removal scripts for "alias" work queues, i.e. an object which contains attributes of an actual queue and a pointer to the actual queue of actual work items. In the case of an alias work queue, the actual queue is local to the system in which the application instance executes. Like local queues, alias queues can be locked/in use. However, unlike "local" queues, "alias" queues are always empty because alias queues do not contain any work items (even though the actual queues to which they point may contain work items). To begin processing of alias queues, program tool 14 queries the application instance for a list of application defined alias work queues (step 310). The application instance identifies all of its work queues by communicating with the application via an interface command such as the "runmqsc" command for the IBM Web Sphere MQ application. A query is made to the application instance and the output containing the list of defined queue names is saved by program tool 14. The application instance identifies the alias work queues by an "alias" type attribute associated with each alias work queue. The list includes the identity of each alias work queue. Then, program tool 14 determines if the alias work queue is currently locked/in use (decision 328). This determination is made by reading a "handle count" attribute of the local work queue to which the alias work queue points. The "handle count" is incremented each time an application instance connects to the alias work queue. If the "handle count" is greater than one, then the alias work queue is currently locked/in use. If the alias work queue is currently locked/in use, then program tool 14 generates a warning that the operator may need to "clear connections" to the named alias work queue to the extent they are not cleared by the lines of script which stop all channels to the application instance (step 332). This warning will be displayed later (in step 810), just prior to execution of the script. In some environments, alias queues cannot be locked; only the queues to which they point can be locked. In this environment, decision 328 will always be "no", or decision 328 and step 332 can be skipped altogether. After step 332 or if the alias work queue was not currently locked/in use, program tool 14 generates a delete work queue command and writes it to the script file (step 340). When the script file is subsequently executed to control the application instance, the application instance will delete the named alias work queue, i.e. delete the named alias work queue object. The foregoing steps 328-340 are repeated for each other alias work queue identified in step 310.

Next, program tool 14 begins a process to identify and write removal scripts for "remote" work queues, i.e. an object which contains routing information that points to an actual queue of work items, often on a remote system. In the case of a remote queue, the actual queue is remote to the system in which the application instance executes. Like local queues, remote queues can be locked/in use in some environments. However, unlike "local" queues, "remote" queues are always empty. Remote queues do not contain any work items. To begin processing of remote queues, program tool 14 queries the application instance 12a for a list of application defined remote work queues (step 410). The application instance identifies all of its work queues by communicating with the application via an interface command such as the "runmqsc" command for the IBM Web Sphere MQ application. A query is made to the application instance and the output containing the list of defined queue names is saved by program tool 14. The application instance identifies the remote work queues by a "remote" type attribute associated with each remote work queue. The list includes the identity of each remote work queue. Then, program tool 14 determines if the remote work queue is currently locked/in use (decision 428). This determination is made by reading a "handle count" attribute of the remote work queue, or perhaps a local queue through which the remote queue may route (i.e. point). The "handle count" is incremented each time an application instance connects to the remote work queue. If the "handle count" is greater than zero, then the remote work queue is currently locked/in use. If the remote work queue is currently locked/in use, then program tool 14 generates a warning that the operator may need to "clear connections" to the named remote work queue to the extent they are not cleared by the lines of script which stop all channels to the application instance (step 432). This warning will be displayed later (in step 810), just prior to execution of the script. In some environments, remote queues cannot be locked; only the queues to which they point can be locked. In this environment, decision 428 will always be "no", or decision 428 and step 432 can be skipped altogether. After step 432 or if the remote work queue was not currently locked/in use, program tool 14 generates a delete work queue command and writes it to the script file (step 440). When the script file is subsequently executed to control the application instance, the application instance will delete the named remote work queue, i.e. delete the named remote work queue object. The foregoing steps 428-440 are repeated for each other remote work queue identified in step 410.

Next, program tool 14 begins a process to identify and write removal scripts for process objects. A process object does not contain work items, and therefore does not need to be cleared. Also, it is not a type of object that would be locked. To begin the processing of the process objects, program tool 14 queries the application instance 12a for a list of user-defined process objects (step 510). The application instance 12a identifies its process objects based on a "process" type attribute for the process objects. The list includes the identity or name of each process object. Then program tool 14 generates a delete process object command and writes it to the script file (step 540). When the script file is subsequently executed to control the application instance, the application instance will delete the named process object. The foregoing steps 528-540 are repeated for each other process object identified in step 510.

Next, program tool 14 begins a process to identify and write removal scripts for channel objects. A channel object does not contain work items, and therefore does not need to be cleared. Also, it is not a type of object that would be locked, although appropriate "stop" commands will already have been written to the script file as defined above. To begin the processing of the channel objects, program tool 14 queries the application instance for a list of user defined channel objects (step 610). The application instance 12a identifies its channel objects based on a "channel" type attribute for the channel objects. The list includes the identity or name of each channel object. Then, program tool 14 generates a delete channel object command and writes it to the script file (step 640). When the script file is subsequently executed to control the application instance, the application instance will delete the named channel object. The foregoing steps 628-640 are repeated for each other channel object identified in step 610.

Next, program tool 14 begins a process to identify and write removal scripts for SSL security objects. An SSL security object does not contain work items, and therefore does not need to be cleared. Also, it is not a type of object type that would be locked. To begin the processing of the SSL security objects, program tool 14 queries the application instance 12a for a list of application defined SSL security objects (step 710). The application instance 12a identifies its SSL security objects based on an "SSL security" type attribute for the SSL security objects. The list includes the identity or name of each SSL security object. Then, program tool 14 generates a delete SSL security object command and writes it to the script file (step 740). When the script file is subsequently executed to control the application instance, the application instance will delete the named SSL security object. The foregoing steps 728-740 are repeated for each other SSL security object identified in step 710.

Next, program tool 14 determines if any user warnings have been generated during steps 232, 332 or 432 (decision 800). If so, program tool 14 notifies the user of what actions the user should take before the foregoing scripts can be executed, what problems may occur during script execution, and/or what actions the operator should take after script execution to correct any problems with the script (step 810). In the illustrated embodiment where one or more queues (of any type) may be locked, the stopping of the channels early in the script program may remove all locks. However, it is also possible that some users/holders of the locks connect to the queue without use of a channel. In such a case, the stopping of the channels will not remove these locks. So, in this case, the warning to the user would state the following:

> Locks were found, and the script program may not remove all of them. Queue removal commands for the locked queue(s) were added to the script, but were commented out so as not to produce execution errors. The operator should run the script the first time to remove all non-locked queues and stop/delete all channels. Then the operator should run this program again to generate a new script file. If locks were cleared, a new script will delete objects that remain. If not, this warning will appear again. In such a case, the operator can contact (by e-mail, pager, telephone, etc.) the users of the other applications that have locked the queues to request that they stop their other applications and thereby terminate the locks. (In the illustrated embodiment, the program tool will identify the names of the queues to the operator, and often the queue name will indicate the user. If not, there should be external documentation which lists the possible users of each queue.) Then, the script program should be executed again.

Next, program tool 14 proceeds to step 62 in FIG. 2 as described above.

As illustrated above, there are several advantages to the present invention. Neither the operator nor the program tool 14 needs any special privilege above that of an application administrator to query the application 12 to obtain the object information, write the scripts and execute the scripts. In the preferred embodiment of the present invention, the foregoing activity would not ordinarily require the privilege of root access or other super user. This is because the script does not attempt to delete the application itself. Moreover, the application instance is not stopped. Also, the operator has the opportunity after decision 62 to edit the script program to remove those commands that would delete certain objects or to add commands to delete additional objects. Thus, the edited script program can single out specific application-created objects to delete and not delete others, if that is the desire of the operator. If desired, a backup tool as described in U.S. patent application Ser. No. 10/728,487, entitled "System, Method and Program for Backing Up an Application or Other Program", filed same day herewith by Christopher N. Kline, US Publication 2005/0125464 of Jun. 9, 2005, now U.S. Pat. No. 7,127,480 can be executed just prior to starting of program tool 14 to save the objects before they are deleted by the script program created by program tool 14. In this manner, the application as it is existed before being reset can be restored if needed. US Patent Application entitled "System, Method and Program for Backing Up an Application or Other Program" is hereby incorporated by reference as part of the present disclosure.

Based on the foregoing, a system, method and program product for resetting an application or an application instance has been described. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A computer program product for resetting a first application or first application instance, the computer program product comprising: a computer-readable hardware storage device and a program tool stored on the storage device, the program tool comprising:

program instructions, responsive to a request to reset the first application or first application instance, to identify for deletion a queue object used or managed by the first application or first application instance;

program instructions, responsive to the request to reset the first application or first application instance, to identify a channel used by another, remote application or remote application instance to lock and access the queue object, and write into a script program a command to the first application or first application instance to stop the channel, wherein a lock held by the remote application or remote application instance on the queue object will automatically be released in response to execution of the command to stop the channel; and program instructions, responsive to the request to reset the first application or first application instance, to write into the script program another command, for execution after the command to stop the channel, to the first application or first application instance to delete work items on the queue object;

program instructions, responsive to the request to reset the first application or first application instance, to make an identification of a local work queue for deletion;

program instructions, responsive to the identification of the local work queue for deletion, to determine if the local work queue is empty of work items;

program instructions, responsive to a determination that the local work queue is not empty of work items, to write into the script program a first delete command to delete all of the work items in the local work queue;

program instructions to, after the command to delete all of the work items in the local work queue has been written into the script program, determine if the local work queue is locked;

program instructions to, responsive to a determination that the local work queue is locked, generate a warning to an operator to clear connections to the local work queue to an extent that the connections to the local work queue are not cleared by lines of the script program which stop all channels to the first application or first application instance, wherein the warning is configured to be displayed prior to execution of the script program;

program instructions to, after the warning has been generated, write into the script program a second delete command to delete the local work queue, wherein the second delete command is commented out to disable the second delete command from being performed if the script program is executed while the local work queue is locked;

program instructions, responsive to verification that the local work queue is unlocked, to uncomment and re-enable the second delete command in the script program; and program instructions to, before the second delete command has been uncommented and re-enabled in the script program and before execution of the script program, display the warning to the operator.

2. The computer program product of claim 1, the program tool stored on the storage device further comprising program instructions, responsive to the request to reset the first application or first application instance, to determine whether there is another lock on the queue object, other than a lock held by the first application or first application instance and other than the lock held by the remote application or remote application instance corresponding to a connection by the remote application or remote application instance to the channel, and if so, notify the operator to clear the other lock.

3. The computer program product of claim 1, wherein the other command is to delete work items on the queue object; and wherein the program instructions to write into the script program another command comprises program instructions to write into the script program another command to the first application or first application instance to determine whether the queue object contains at least one work item, and if not, not to execute the other command to the first application or first application instance to delete work items on the queue object.

4. The computer program product of claim 1, wherein the other command is to delete work items on the queue object; and the program instructions to write into the script program another command comprises program instructions to write into the script program another command, for execution after the command to stop the channel and the other command to delete work items on the queue object, to the first application or first application instance to delete the queue object.

5. The computer program product of claim 1, wherein the first application or first application instance is a middleware application or middle application instance which manages the queue object.

6. The computer program product of claim 1, wherein the program instructions to identify the channel used by the remote application or remote application instance to lock and access the queue object by querying the first application or first application instance.

7. The computer program product of claim 1, wherein the script program is not configured to delete the first application.

8. The computer program product of claim 1, wherein the script program is not configured to stop the first application instance.

9. A computer system for resetting a first application or first application instance, the computer system comprising: a central processing unit; a computer readable memory; a computer-readable hardware storage device and a program tool stored on the storage device for execution by the central processing unit via the computer readable memory, the program tool comprising:

program instructions, responsive to a request to reset the first application or first application instance, to identify for deletion a queue object used or managed by the first application or first application instance;

program instructions, responsive to the request to reset the first application or first application instance, to identify a channel used by another, remote application or remote application instance to lock and access the queue object, and write into a script program a command to the first application or first application instance to stop the channel, wherein a lock held by the remote application or remote application instance on the queue object will automatically be released in response to execution of the command to stop the channel; and program instructions, responsive to the request to reset the first application or first application instance, to write into the script program another command, for execution after the command to stop the channel, to the first application or first application instance to delete work items on the queue object;

program instructions, responsive to the request to reset the first application or first application instance, to make an identification of a local work queue for deletion;

program instructions, responsive to the identification of the local work queue for deletion, to determine if the local work queue is empty of work items;

program instructions, responsive to a determination that the local work queue is not empty of work items, to write into the script program a command to delete all of the work items in the local work queue;

program instructions to, after the command to delete all of the work items in the local work queue has been written into the script program, determine if the local work queue is locked;

program instructions, responsive to a determination that the local work queue is locked, to write into the script program a command to generate a warning to an operator to clear connections to the local work queue to an extent that the connections to the local work queue are not cleared by lines of the script program which stop all channels to the first application or first application instance, wherein the warning is configured in the script program to be subsequently displayed prior to execution of the script program;

program instructions to, after the warning has been generated, write into the script program a second delete command to delete the local work queue, wherein the second delete command is commented out to disable the second delete command from being performed if the script program is executed while the local work queue is locked;

program instructions, responsive to verification that the local work queue is unlocked, to uncomment and re-enable the second delete command in the script program; and program instructions to, before the second delete command has been uncommented and re-enabled in the script program and before execution of the script program, display the warning to the operator.

10. The computer system of claim 9, the program tool stored on the storage device further comprising program instructions, responsive to the request to reset the first application or first application instance, to determine whether there is another lock on the queue object, other than a lock held by the first application or first application instance and other than the lock held by the remote application or remote application instance corresponding to a connection by the remote application or remote application instance to the channel, and if so, notify the operator to clear the other lock.

11. The computer system of claim 9, wherein the other command is to delete work items on the queue object; and wherein the program instructions to write into the script program another command comprises program instructions to write into the script program another command to the first application or first application instance to determine whether the queue object contains at least one work item, and if not, not to execute the other command to the first application or first application instance to delete work items on the queue object.

12. The computer system of claim 9, wherein the other command is to delete work items on the queue object; and the program instructions to write into the script program another command comprises program instructions to write into the script program another command, for execution after the command to stop the channel and the other command to delete work items on the queue object, to the first application or first application instance to delete the queue object.

13. The computer system of claim 9, wherein the first application or first application instance is a middleware application or middle application instance which manages the queue object.

14. The computer system of claim 9, wherein the program instructions to identify the channel used by the remote application or remote application instance to lock and access the queue object by querying the first application or first application instance.

15. The computer system of claim 9, wherein the script program is not configured to delete the first application.

16. The computer system of claim 9, wherein the script program is not configured to stop the first application instance.

* * * * *